US007544741B2

United States Patent
(12) United States Patent
Mitsui et al.

(10) Patent No.: US 7,544,741 B2
(45) **Date of Patent: *Jun. 9, 2009**

(54) COMPOSITION COMPRISING POLY(2,6-DIMETHYLPHENYLENE) ETHER

(75) Inventors: Akira Mitsui, Sodegaura (JP); Mutsumi Maeda, Sodegaura (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 94 days.

This patent is subject to a terminal disclaimer.

(21) Appl. No.: 10/491,490

(22) PCT Filed: Nov. 28, 2002

(86) PCT No.: PCT/JP02/12453

§ 371 (c)(1), (2), (4) Date: Apr. 1, 2004

(87) PCT Pub. No.: WO03/048254

PCT Pub. Date: Jun. 12, 2003

(65) Prior Publication Data

US 2004/0249109 A1 Dec. 9, 2004

(30) Foreign Application Priority Data

Dec. 4, 2001 (JP) ............................ 2001-369563

(51) Int. Cl.
*C08K 5/49* (2006.01)
*C08L 71/12* (2006.01)

(52) U.S. Cl. ....................... 525/132; 524/575; 524/590; 524/594; 524/601; 524/606; 524/611; 525/390; 525/392; 525/395; 525/396; 525/397

(58) Field of Classification Search ....................... None
See application file for complete search history.

(56) References Cited

U.S. PATENT DOCUMENTS

| | | | | |
|---|---|---|---|---|
| 3,642,699 | A * | 2/1972 | Cooper et al. | 528/215 |
| 4,092,294 | A | 5/1978 | Bennett, Jr. et al. | |
| 4,788,277 | A * | 11/1988 | Ibe et al. | 528/215 |
| 4,831,115 | A * | 5/1989 | Golba et al. | 528/481 |
| 4,992,222 | A * | 2/1991 | Banevicius et al. | 264/45.9 |
| 5,693,742 | A * | 12/1997 | White et al. | 528/212 |
| 6,258,881 | B1 * | 7/2001 | Moritomi | 524/267 |
| 6,521,735 | B2 * | 2/2003 | Mitsui et al. | 528/215 |
| 6,841,629 | B1 * | 1/2005 | Maeda et al. | 525/534 |
| 7,060,781 | B2 * | 6/2006 | Mitsui et al. | 528/217 |
| 7,282,534 | B2 * | 10/2007 | Sakuma et al. | 524/611 |
| 2005/0228123 | A1 * | 10/2005 | Sakuma et al. | 524/611 |

FOREIGN PATENT DOCUMENTS

| | | | |
|---|---|---|---|
| JP | 64-33131 | | 2/1989 |
| JP | 4-250005 | | 9/1992 |
| JP | 7-76015 | A * | 3/1995 |
| JP | 9-136345 | | 5/1997 |
| JP | 2001-47496 | | 2/2001 |
| JP | 2002-307427 | | 10/2002 |

OTHER PUBLICATIONS

Derwent accession No. 1989-081124, CAPLUS accession No. 1989:440103 and Patent Abstracts of Japan abstracts for Japanese Patent No.1-33131 A, Asahi Chemical Industry Company, Limited, Feb. 3, 1989, three pages.*

Memorandum on Information Disclosure Statement in which the relevancy of the references are described.

* cited by examiner

*Primary Examiner*—Robert Sellers
(74) *Attorney, Agent, or Firm*—Dickstein Shapiro LLP

(57) ABSTRACT

A polyphenylene ether resin composition comprising a polyphenylene ether, wherein the polyphenylene ether has a polymer chain comprising recurring units each represented by the following formula (1):

$$\left[ -\!\!\!\bigcirc\!\!\!-O- \right] \quad \text{(2,6-dimethyl-1,4-phenylene oxide unit, with } CH_3 \text{ groups at positions 2 and 6)} \tag{1}$$

and has the following characteristics (a), (b) and (c):

(a) when the polyphenylene ether is analyzed by $^1$H-NMR, the polyphenylene ether exhibits a triplet signal (S1) at 3.55 ppm, wherein the triplet signal (S1) has a relative intensity of 0.05 to 0.25 in terms of the percentage of the integrated intensity of the triplet signal (S1), based on the integrated intensity of a signal (S2) observed at 6.47 ppm;

(b) the polyphenylene ether exhibits an absorbance of from 0.01 to 0.40 at a wavelength of 480 nm; and (c) the polyphenylene ether has a weight average molecular weight of from 30,000 to 100,000.

5 Claims, 1 Drawing Sheet

COMPOSITION COMPRISING POLY(2,6-DIMETHYLPHENYLENE) ETHER

BACKGROUND OF THE INVENTION

1. Field of the Invention

The present invention relates to a polyphenylene ether resin composition. More particularly, the pre-sent invention is concerned with a polyphenylene ether resin composition comprising a polyphenylene ether, wherein the polyphenylene ether has a polymer chain comprising specific recurring units and has the following characteristics: when the polyphenylene ether is analyzed by proton nuclear magnetic resonance spectroscopy ($^1$H-NMR), the polyphenylene ether exhibits a triplet signal having a specific intensity at 3.55 ppm; when the polyphenylene ether is analyzed by ultraviolet-visible spectroscopy, the polyphenylene ether exhibits an absorbance of from 0.01 to 0.40 at a wavelength of 480 nm; and the polyphenylene ether has a weight average molecular weight of from 30,000 to 100,000.

The polyphenylene ether resin composition of the present invention not only has excellent properties comparable to those of conventional polyphenylene ether resin compositions, especially with respect to heat resistance, electrical characteristics, acid resistance, alkali resistance, dimensional stability, low specific gravity and low water absorption, but also exhibits an excellent balance of fluidity, chemicals resistance (i.e., resistance to organic solvents and oils) and appearance of a molded article obtained therefrom as well as excellent color of a molded article obtained therefrom. Therefore, the polyphenylene ether resin composition of the present invention can be advantageously used in various application fields, such as thin-walled parts and oil-resistant parts (e.g., electric and electronic parts and automobile parts) which stay intact even when oils adhere thereto.

2. Prior Art

A polyphenylene ether inherently exhibits not only excellent heat resistance, electrical characteristics, acid resistance, alkali resistance and dimensional stability, but also a low specific gravity, a low water absorption and the like, so that a polyphenylene ether has conventionally been widely used. Further, there are also known various types of polyphenylene ethers having improved properties with respect to chemicals resistance (i.e., resistance to organic solvents and oils), appearance of a molded article obtained therefrom, and the like. However, a polyphenylene ether has not only a high glass transition temperature but also a property that the molecular weight increases during the heat-melting thereof, so that the polyphenylene ether is defective in fluidity, that is, the polyphenylene ether is difficult to mold by melting. For alleviating this defect, it has conventionally been attempted to use a polyphenylene ether in the form of a composition thereof with another material.

For example, a polyphenylene ether has high compatibility with a polystyrene, so that it has been attempted to produce an alloy of the polyphenylene ether with a styrene polymer resin to thereby improve the fluidity of the polyphenylene ether. However, such an alloy cannot exhibit any longer not only excellent heat resistance inherently possessed by the polyphenylene ether, but also excellent chemicals resistance and appearance of a molded article obtained therefrom.

For improving the fluidity of a polyphenylene ether, it has also been attempted to use a polyphenylene ether resin composition which is produced by mixing a first polyphenylene ether having a molecular weight sufficient to mold and a second polyphenylene ether having a low molecular weight. In this resin composition, the fluidity is improved due to the shift of the molecular weight distribution of the polyphenylene ether toward the low molecular weight region.

The above-mentioned attempt is described, for example, in the Examples of Examined Japanese Patent Application Publication No. Sho 45-25992 and in Japanese Patent No. 2648887 (corresponding to U.S. Pat. No. 5,081,185), each of which proposes a resin composition comprising two types of polyphenylene ethers having different solution viscosities. By the above-mentioned attempt, on one hand, the polyphenylene ether is improved with respect to fluidity, but on the other hand, it is inevitably diminished with respect to some properties (such as chemicals resistance) as well as a molded article appearance. Further, the attempt is disadvantageous in that, for individually producing the above-mentioned two types of polyphenylene ethers having different solution viscosities and mixing these polyphenylene ethers, it is necessary to employ an extremely complicated apparatus.

As mentioned above, in the prior art, there has been a technical dilemma in that, when it is attempted to improve the fluidity of a polyphenylene ether, other important properties (such as chemicals resistance and molded article appearance) inherently possessed by the polyphenylene ether are inevitably diminished.

Therefore, it has been desired to develop a polyphenylene ether resin composition which not only retains excellent properties inherently possessed by conventional polyphenylene ethers, but also exhibits an excellent balance of fluidity, chemicals resistance and molded article appearance.

SUMMARY OF THE INVENTION

In this situation, the present inventors have made extensive and intensive studies with a view toward solving the above-mentioned problems accompanying the prior art. As a result, it has unexpectedly been found that a polyphenylene ether resin composition comprising a specific polyphenylene ether not only has excellent properties comparable to those of conventional polyphenylene ether resin compositions, especially with respect to heat resistance, electrical characteristics, acid resistance, alkali resistance, dimensional stability, low specific gravity and low water absorption, but also exhibits an excellent balance of fluidity, chemicals resistance and molded article appearance as well as excellent color of a molded article. The above-mentioned specific polyphenylene ether has the following characteristics: when the polyphenylene ether is analyzed by proton nuclear magnetic resonance spectroscopy ($^1$H-NMR), the polyphenylene ether exhibits a triplet signal having a specific intensity at 3.55 ppm; when the polyphenylene ether is analyzed by ultraviolet-visible spectroscopy, the polyphenylene ether exhibits an absorbance of from 0.01 to 0.40 at a wavelength of 480 nm; and the polyphenylene ether has a weight average molecular weight of from 30,000 to 100,000. Based on this finding, the present invention has been completed.

Accordingly, it is an object of the present invention to provide a polyphenylene ether resin composition which not only has excellent properties comparable to those of conventional polyphenylene ether resin compositions, especially with respect to heat resistance, electrical characteristics, acid resistance, alkali resistance, dimensional stability, low specific gravity and low water absorption, but also exhibits an excellent balance of fluidity, chemicals resistance and molded article appearance as well as excellent color of a molded article.

The foregoing and other objects, features and advantages of the present invention will be apparent from the following detailed description and appended claims taken in connection with the accompanying drawing.

DETAILED DESCRIPTION OF THE INVENTION

Figure 1:
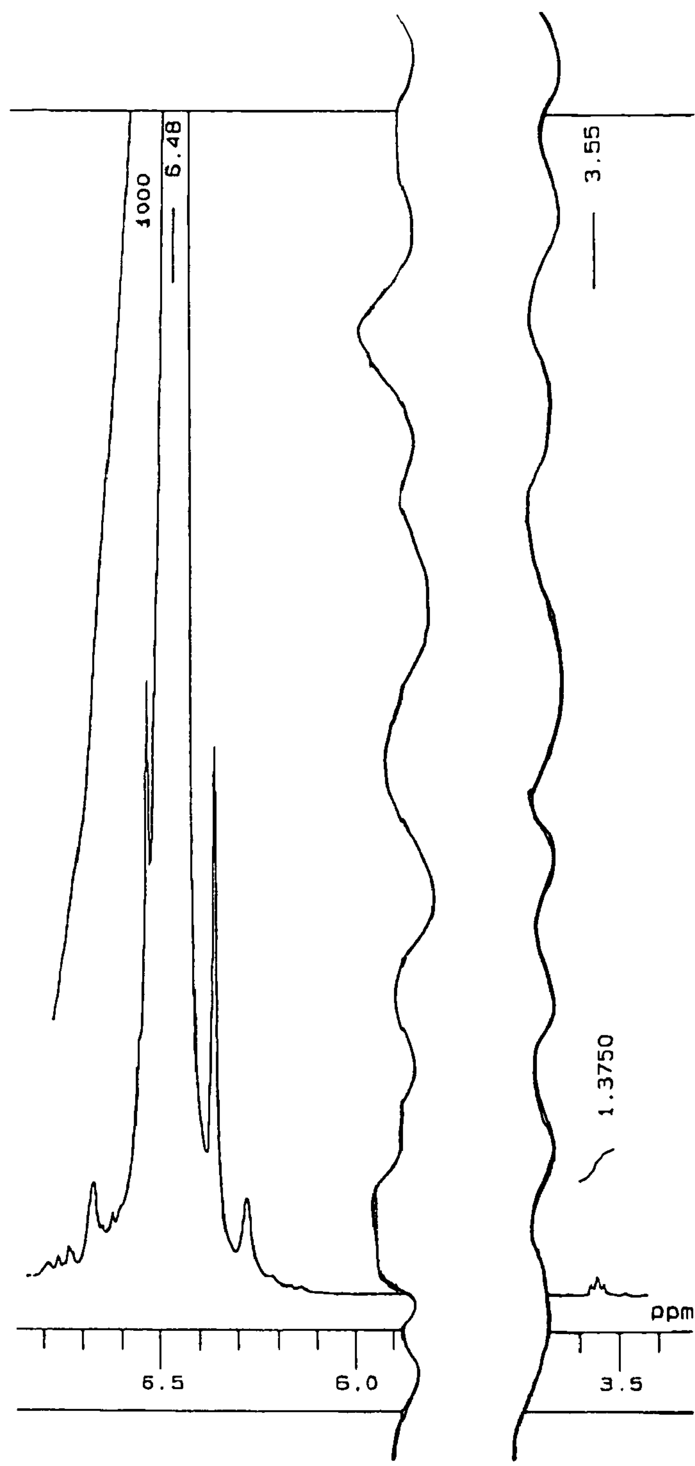
FIG. 1 is a chart showing a $^{1}$H-NMR spectrum of a purified polyphenylene ether which is obtained by isolating and purifying the polyphenylene ether contained in the polyphenylene ether resin composition produced in Example 1. In this chart, only signals which are characteristic of the present invention are shown.

According to the present invention, there is provided a polyphenylene ether resin composition comprising a polyphenylene ether, the polyphenylene ether having a polymer chain comprising recurring units each represented by the following formula (I):

(1)

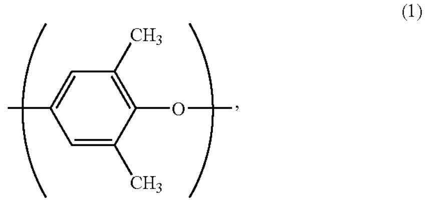

the polyphenylene ether having the following characteristics (a), (b) and (c):

(a) when the polyphenylene ether is analyzed by proton nuclear magnetic resonance spectroscopy ($^{1}$H-NMR) using tetramethylsilane as a reference, the polyphenylene ether exhibits a triplet signal (S1) at 3.55 ppm, the triplet signal (S1) having a relative intensity of 0.05 to 0.25 in terms of the percentage of the integrated intensity of the triplet signal (S1), based on the integrated intensity of a signal (S2) observed at 6.47 ppm;

(b) when a 0.05 g/ml solution of the polyphenylene ether in chloroform is analyzed by ultraviolet-visible spectroscopy using a cell having an optical path of 1 cm, the polyphenylene ether exhibits an absorbance of from 0.01 to 0.40 at a wavelength of 480 nm; and (c) the polyphenylene ether has a weight average molecular weight of from 30,000 to 100,000 as measured by gel permeation chromatography using a calibration curve obtained with respect to standard monodisperse polystyrene samples.

For easy understanding of the present invention, the essential features and various preferred embodiments of the present invention are enumerated below.

1. A polyphenylene ether resin composition comprising a polyphenylene ether, the polyphenylene ether having a polymer chain comprising recurring units each represented by the following formula (1):

(1)

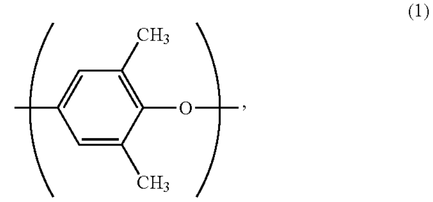

the polyphenylene ether having the following characteristics (a), (b) and (c):

(a) when the polyphenylene ether is analyzed by proton nuclear magnetic resonance spectroscopy ($^{1}$H-NMR) using tetramethylsilane as a reference, the polyphenylene ether exhibits a triplet signal (S1) at 3.55 ppm, the triplet signal (S1) having a relative intensity of 0.05 to 0.25 in terms of the percentage of the integrated intensity of the triplet signal (S1), based on the integrated intensity of a signal (S2) observed at 6.47 ppm;

(b) when a 0.05 g/ml solution of the polyphenylene ether in chloroform is analyzed by ultraviolet-visible spectroscopy using a cell having an optical path of 1 cm, the polyphenylene ether exhibits an absorbance of from 0.01 to 0.40 at a wavelength of 480 nm; and (c) the polyphenylene ether has a weight average molecular weight of from 30,000 to 100,000 as measured by gel permeation chromatography using a calibration curve obtained with respect to standard monodisperse polystyrene samples.

2. The polyphenylene ether resin composition according to item 1 above, wherein the content of the polyphenylene ether in the polyphenylene ether resin composition is from 0.1 to 99.9% by weight.

3. The polyphenylene ether resin composition according to item 2 above, wherein the content of the polyphenylene ether in the polyphenylene ether resin composition is from 10 to 90% by weight.

4. The polyphenylene ether resin composition according to any one of items 1 to 3 above, wherein, in the curve obtained by subjecting the polyphenylene ether resin composition to differential scanning calorimetry, the amount of heat absorbed by the polyphenylene ether is not more than 0.1 J/g, wherein the amount of heat absorbed is defined by the area of an endothermic peak ascribed to the polyphenylene ether, the endothermic peak being observed in the range of from 230 to 270° C.

5. The polyphenylene ether resin composition according to any one of items 1 to 4 above, which has a volatile component content of 2% by weight or less.

6. The polyphenylene ether resin composition according to any one of items 1 to 5 above, wherein the relative intensity of the triplet signal (S1) in the $^{1}$H-NMR is from 0.05 to 0.15, and the absorbance in the ultraviolet-visible spectroscopy is from 0.01 to 0.30.

Hereinbelow, the present invention is described in detail.

The polyphenylene ether in the polyphenylene ether resin composition of the present invention has a polymer chain comprising recurring units each represented by the following formula (1):

(1)

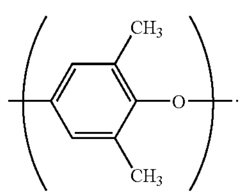

The polyphenylene ether in the polyphenylene ether resin composition has the following characteristics (a), (b) and (c):

(a) when the polyphenylene ether is analyzed by proton nuclear magnetic resonance spectroscopy ($^{1}$H-NMR) using tetramethylsilane as a reference, the polyphenylene ether exhibits a triplet signal (S1) at 3.55 ppm, the triplet signal (S1) having a relative intensity of 0.05 to 0.25 in terms of the percentage of the integrated intensity of the triplet signal (S1), based on the integrated intensity of a signal (S2) observed at 6.47 ppm;

(b) when a 0.05 g/ml solution of the polyphenylene ether in chloroform is analyzed by ultraviolet-visible spectroscopy using a cell having an optical path of 1 cm, the polyphenylene ether exhibits an absorbance of from 0.01 to 0.40 at a wavelength of 480 nm; and (c) the polyphenylene ether has a weight average molecular weight of from 30,000 to 100,000 as measured by gel permeation chromatography using a calibration curve obtained with respect to standard monodisperse polystyrene samples.

Hereinbelow, explanations are made with respect to the above-mentioned characteristics (a), (b) and (c).

First, explanations are made with respect to the characteristic (a). In the characteristic (a), a measurement by proton nuclear magnetic resonance spectroscopy ($^{1}$H-NMR) is conducted as follows. First, the polyphenylene ether in the polyphenylene ether resin composition is isolated and purified (the method for the isolation and purification is described below). The isolated and purified polyphenylene ether is dissolved in deuterated chloroform to obtain a solution. The thus obtained solution is analyzed by $^{1}$H-NMR using tetramethylsilane as a reference for chemical shift (0 ppm).

In the analysis of the deuterated chloroform solution by the $^{1}$H-NMR, it is required that the polyphenylene ether exhibit a triplet signal (S1) at 3.55 ppm and that the triplet signal (S1) have a relative intensity of 0.05 to 0.25 in terms of the percentage of the integrated intensity of the triplet signal (S1), based on the integrated intensity of a signal (S2) observed at 6.47 ppm. The signal (S2) observed at 6.47 ppm is ascribed to the protons present at the 3-position and 5-position of the above-mentioned recurring unit of the polyphenylene ether. On the other hand, with respect to the structure to which the triplet signal (S1) observed at 3.55 ppm is ascribed, no elucidation has been made.

Depending on the measurement accuracy of the apparatus employed for the $^{1}$H-NMR, with respect to each of the found values of the frequency at which the signals are observed, it is possible that the value has a measurement error in the range of from −0.005 to +0.005 ppm.

The above-mentioned relative intensity is preferably in the range of from 0.05 to 0.15, more preferably from 0.06 to 0.14. When the relative intensity is more than 0.25, the chemicals resistance of the polyphenylene ether resin composition becomes low. On the other hand, when the relative intensity is less than 0.05, the fluidity of the polyphenylene ether resin composition becomes low.

With respect to the characteristic (b), explanations are made below. In the characteristic (b), a measurement by ultraviolet-visible spectroscopy is conducted as follows. First, the polyphenylene ether in the polyphenylene ether resin composition is isolated and purified (the method for the isolation and purification is described below). The isolated and purified polyphenylene ether is dissolved in chloroform to obtain a 0.05 g/ml chloroform solution of a polyphenylene ether. The thus obtained solution is analyzed by ultraviolet-visible spectroscopy using a cell having an optical path of 1 cm.

In the analysis of the solution by the ultraviolet-visible spectroscopy, it is required that the polyphenylene ether exhibits an absorbance of from 0.01 to 0.40 at a wavelength of 480 nm. By virtue of the characteristic (b), a molded article obtained from the polyphenylene ether resin composition of the present invention exhibits excellent color. The absorbance of the polyphenylene ether at a wavelength of 480 nm is preferably in the range of from 0.01 to 0.30, more preferably from 0.01 to 0.25. When the absorbance is more than 0.40, the color of the molded article becomes poor.

The absorbance of the polyphenylene ether at a wavelength of 480 nm can be used as an index for evaluating the color of a molded article obtained from the polyphenylene ether resin composition. The reason for this is as follows. In general, a visible light (i.e., light visible to the human eye) has a wavelength in the range of from 400 to 800 nm. The smaller the absorbance of the polyphenylene ether at the wavelength of a visible light, the lighter the complementary color of the visible light. The complementary color of the visible light having a wavelength of 480 nm is from yellow to orange, and the color of the polyphenylene ether is also from yellow to orange. Therefore, the smaller the absorbance of the polyphenylene ether at the wavelength of 480 nm, the lighter the color (from yellow to orange) of a molded article obtained from the polyphenylene ether resin composition. Thus, the absorbance of the polyphenylene ether at the wavelength of 480 nm can be used as an index for evaluating the color of the molded article.

With respect to the characteristic (c), explanations are made below. In the characteristic (c), the measurement of the weight average molecular weight is conducted as follows. First, the polyphenylene ether in the polyphenylene ether resin composition is isolated and purified (the method for the isolation and purification is described below). With respect to the isolated and purified polyphenylene ether, the gel permeation chromatography (GPC) for measuring the weight average molecular weight is conducted.

In the measurement by the above-mentioned GPC, it is necessary that the polyphenylene ether have a weight average molecular weight of from 30,000 to 100,000. The weight average molecular weight of the polyphenylene ether is preferably in the range of from 30,000 to 90,000, more preferably from 30,000 to 80,000. When the weight average molecular weight of the polyphenylene ether is smaller than 30,000, the chemicals resistance of the polyphenylene ether resin composition becomes low. On the other hand, when the weight average molecular weight of the polyphenylene ether is larger than 100,000, not only does the fluidity of the polyphenylene ether resin composition become low, but also the color of a molded article obtained from the polyphenylene ether resin composition becomes slightly poor.

With respect to the content of the polyphenylene ether in the polyphenylene ether resin composition, there is no particular limitation. However, the content of the polyphenylene ether in the polyphenylene ether resin composition is generally in the range of from 0.1 to 99.9% by weight, preferably from 10 to 90% by weight, more preferably from 15 to 85% by weight.

With respect to the types of the components (other than the polyphenylene ether) of the polyphenylene ether resin composition of the present invention, there is no particular limitation. For example, there can be used at least one component selected from the group consisting of a thermoplastic resin, a thermocurable resin and an additive.

Examples of thermoplastic resins include styrene polymer resins (including rubber reinforced polystyrene resins, AS resins and ABS resins), polyamide resins, olefin polymer resins, polyester resins, liquid crystal resins and thermoplastic elastomers.

Examples of thermocurable resins include epoxy resins, unsaturated polyester resins, polyurethane resins, crosslinked acryl resins, bismaleimide resins and phenolic resins.

Examples of additives include plasticizers, stabilizers, modifiers, ultraviolet absorbers, flame retardants, coloring agents, mold release agents, reinforcing agents and fillers. Examples of stabilizers and modifiers include phosphonic esters, hindered phenols, sulfur-containing antioxidants, alkanolamines, acid amides, metal salts of dithiocarbamic acid, inorganic sulfides, metal oxides, carboxylic anhydrides, dienophiles (such as styrene and stearyl acrylate) and epoxy group-containing compounds. Examples of reinforcing agents include fibrous reinforcing agents, such as a glass fiber and a carbon fiber. Examples of fillers include glass bead, calcium carbonate and talc.

The above-mentioned components other than the polyphenylene ether can be used individually or in combination.

With respect to the form of the polyphenylene ether resin composition of the present invention, there is no particular limitation; however, the polyphenylene ether resin composition is generally provided in the form of pellets.

The polyphenylene ether used for the analyses in the above-mentioned characteristics (a) to (c) is obtained by isolating and purifying the polyphenylene ether in the polyphenylene ether resin composition. The isolation and purification of the polyphenylene ether can be conducted by a conventional method. However, the purification of the polyphenylene ether must be performed to such an extent that the analyses can be satisfactorily conducted. Specifically, in the case of the proton nuclear magnetic resonance spectroscopy, the purification of the polyphenylene ether must be performed to such an extent that the calculation of the integrated intensities of the signals (S1) and (S2) can be satisfactorily conducted. On the other hand, in the case of the ultraviolet-visible spectroscopy, the purification of the polyphenylene ether must be performed to such an extent that the absorbances of the components (other than the polyphenylene ether) do not overlap with that of the polyphenylene ether at a wavelength of 480 nm. Further, in the case of the GPC, the purification of the polyphenylene ether must be performed to such an extent that the absorbances of the components (other than polyphenylene ether) are not detected at a wavelength of 283 nm, which is the wavelength of a monitoring light used for the GPC detector.

With respect to the method for isolating and purifying the polyphenylene ether in the polyphenylene ether resin composition, explanations are made below, taking as examples a case where the composition contains a styrene polymer resin as a component other than the polyphenylene ether and a case where the composition contains a polyamide resin as a component other than the polyphenylene ether.

<Case where the composition contains a styrene polymer resin as a component other than the polyphenylene ether>

About 10 g of the polyphenylene ether resin composition is introduced into 150 ml of chloroform. The resultant mixture is subjected to centrifugal separation to separate the mixture into a supernatant and solids. The solids are discarded, and the supernatant is recovered. To the recovered supernatant is added a large amount of methanol to precipitate a polymer component dissolved in the supernatant. The precipitated polymer component is recovered by filtration, followed by multiple washings with methanol, thereby obtaining wet solids. The obtained wet solids are dried in a vacuum drier having a temperature of 110° C. The resultant dried solids are introduced into about 100 ml of methylene chloride. The resultant mixture is allowed to stand still at −5° C. for 24 hours to form a precipitate therein. The precipitate is recovered as a filtration residue by filtration. The filtration residue is washed with methylene chloride cooled to a temperature of from 0 to 5° C., as swiftly as possible. The resultant filtration residue is dried in a vacuum drier having a temperature of 110° C., thereby obtaining a purified, solid polyphenylene ether.

When the thus obtained solid polyphenylene ether is not satisfactorily purified, the solid polyphenylene ether is further subjected to the following treatment. The solid polyphenylene ether is introduced into about 100 ml of methylene chloride. The resultant mixture is allowed to stand still at −5° C. for 24 hours to form a precipitate therein. The precipitate is recovered as a filtration residue by filtration. The filtration residue is washed with methylene chloride cooled to a temperature of from 0 to 5° C., as swiftly as possible. The resultant filtration residue is dried in a vacuum drier having a temperature of 110° C., thereby obtaining a further purified, solid polyphenylene ether.

<Case where the composition contains a polyamide resin as a component other than the polyphenylene ether>

About 10 g of the polyphenylene ether resin composition is introduced into about 500 ml of formic acid. The resultant mixture is subjected to centrifugal separation to separate the mixture into a supernatant and solids. The supernatant is discarded, and the solids are recovered. The recovered solids are washed with formic acid several times. The resultant solids are introduced into chloroform to obtain a mixture. In the mixture, a part of the solids remains undissolved in the chloroform. Such an undissolved component is removed by filtration, thereby obtaining a chloroform solution as a filtrate. To the filtrate is added a large amount of methanol to precipitate a polymer component dissolved in the chloroform solution. The precipitated polymer component is recovered by filtration, followed by multiple washings with methanol, thereby obtaining wet solids. The obtained wet solids are dried in a vacuum drier having a temperature of 110° C., thereby obtaining a purified, solid polyphenylene ether.

When the thus obtained solid polyphenylene ether is not satisfactorily purified, the solid polyphenylene ether is further subjected to the following treatment. The solid polyphenylene ether is introduced into about 100 ml of methylene chloride. The resultant mixture is allowed to stand still at −5° C. for 24 hours to form a precipitate therein. The precipitate is recovered as a filtration residue by filtration. The filtration residue is washed with methylene chloride cooled to a temperature of from 0 to 5° C., as swiftly as possible. The resultant filtration residue is dried in a vacuum drier having a temperature of 110° C., thereby obtaining a further purified, solid polyphenylene ether.

In the curve obtained by subjecting the polyphenylene ether resin composition of the present invention to differential scanning calorimetry (DSC), it is preferred that the amount of heat absorbed by the polyphenylene ether is not more than 0.1

J/g, more advantageously not more than 0.06 J/g, wherein the amount of heat absorbed is defined by the area of an endothermic peak ascribed to the polyphenylene ether, wherein the endothermic peak is observed in the range of from 230 to 270° C. In the DSC, it is possible that the found value of the amount of heat absorbed by the polyphenylene ether is 0 J/g. In this case, no endothermic peak ascribed to the polyphenylene ether is observed. When the amount of heat absorbed by the polyphenylene ether is not more than 0.1 J/g, the appearance of a molded article obtained from the polyphenylene ether resin composition is further improved.

The above-mentioned DSC is conducted using a differential scanning calorimeter as follows. There is provided 4 to 6 mg of a polyphenylene ether resin composition which has not experienced heat treatment at 180° C. or more. This polyphenylene ether resin composition is subjected to DSC under conditions wherein the temperature of the polyphenylene ether resin composition is elevated at a rate of 20° C./min from 50° C. to 300° C. in an atmosphere of nitrogen gas.

It is preferred that the polyphenylene ether resin composition of the present invention has a volatile component content of 2% by weight or less, more advantageously 1% by weight or less. When the volatile component content of the polyphenylene ether resin composition is 2% by weight or less, the appearance of a molded article obtained therefrom is further improved.

The volatile component content of the polyphenylene ether resin composition is measured as follows. The polyphenylene ether resin composition is dried in a vacuum drier having a temperature of 150° C. for 2 days. The weights of the resin composition before and after the drying are measured. The volatile component content of the polyphenylene ether resin composition is calculated by the following formula:

Volatile component content of the resin composition (% by weight)=[{(weight of the resin composition before drying)−(weight of the resin composition after drying)}/(weight of the resin composition before drying)]×100.

With respect to the method for producing the polyphenylene ether resin composition of the present invention, explanations are made below.

As the polyphenylene ether used as a raw material for the resin composition of the present invention (hereinafter, such a polyphenylene ether is frequently referred to as "raw material polyphenylene ether"), there can be used a polyphenylene ether produced by a conventional method. However, in the production of a raw material polyphenylene ether, it is necessary to use a secondary monoamine (such as di-n-butylamine) as a catalyst. Specifically, for example, a raw material polyphenylene ether can be produced by a method comprising subjecting 2,6-dimethylphenol to oxidative polymerization using an oxygen-containing gas in the presence of a secondary monoamine as a catalyst. With respect to this method for producing a raw material polyphenylene ether, reference can be made to Examined Japanese Patent Application Publication No. Sho 59-23332 (corresponding to U.S. Pat. No. 4,092,294 and the patent documents AU517473B, BR7705735, MX145868, GB1538361, DE2738889, NL189715C, FR2367096 and IT1085159), Examined Japanese Patent Application Publication No. Sho 61-20576 (corresponding to U.S. Pat. No. 4,140,675 and the patent documents AU7836524, GB1599472, DE2822858, NL7805757 and FR2392058B) and Examined Japanese Patent Application Publication No. Hei 5-13966.

The 2,6-dimethylphenol used in the above-mentioned method may contain a small amount of at least one type of impurity. Examples of such impurities include phenol, o-cresol, m-cresol, p-cresol, 2,4-dimethylphenol, 2-ethylphenol and 2,3,6-trimethylphenol.

It is preferred that the raw material polyphenylene ether has a weight average molecular weight of from 20,000 to 100,000. The measurement of the weight average molecular weight of the raw material polyphenylene ether is conducted by GPC in substantially the same manner as in the measurement of the weight average molecular weight of the polyphenylene ether in the polyphenylene ether resin composition.

The polyphenylene ether resin composition of the present invention can be produced, for example, by a method in which a mixture of a raw material polyphenylene ether and a material other than the raw material polyphenylene ether is melt-kneaded. Alternatively, the polyphenylene ether resin composition can also be produced by a method in which a mixture of a raw material polyphenylene ether and a material other than the raw material polyphenylene ether is dissolved in a solvent, such as toluene, and the resultant solution is subjected to flash distillation or a degassing extruder, thereby removing the solvent from the solution. In the above-mentioned methods, the polyphenylene ether resin composition is obtained in the form of pellets.

Hereinbelow, explanations are made with respect to the method for producing the polyphenylene ether resin composition by melt-kneading a mixture of a raw material polyphenylene ether and a material other than the raw material polyphenylene ether. The melt-kneading of the mixture can be conducted by using an extruder, a heating roll, a Banbury mixer, a kneader, a Henschel mixer or the like. The temperature employed for the melt-kneading is generally a temperature which is not lower than the glass transition temperature (about 215° C.) of the raw material polyphenylene ether. The meltkneading temperature is preferably in the range of from 240 to 390° C., more preferably from 260 to 370° C., most preferably from 270 to 340° C. The residence time is preferably in the range of from 25 to 300 sec. When the melt-kneading temperature and/or the residence time is not within the above-mentioned range, it becomes difficult to obtain a polyphenylene ether resin composition having the above-mentioned characteristic (a). During the melt-kneading of the above-mentioned mixture of a raw material polyphenylene ether and a material other than the raw material polyphenylene ether, it is preferred to apply a shearing force to the mixture satisfactorily.

For obtaining a polyphenylene ether resin composition wherein, in the curve obtained by subjecting the polyphenylene ether resin composition to differential scanning calorimetry (DSC), the amount of heat absorbed by the polyphenylene ether is not more than 0.1 J/g (wherein the amount of heat absorbed is defined by the area of an endothermic peak ascribed to the polyphenylene ether and observed in the range from 230 to 270° C.), it is preferred that the above-mentioned mixture is melt-kneaded at a temperature in the range of from 270 to 340° C. and, in the melt-kneading, a satisfactory shearing force is applied within a residence time of from 25 to 300 sec.

With respect to a conventional polyphenylene ether resin composition, in the curve obtained by subjecting the conventional resin composition to above-mentioned DSC, the amount of heat absorbed by the polyphenylene ether is generally in the range of from 1 to 25 J/g, wherein the amount of heat absorbed is defined by the area of an endothermic peak ascribed to the polyphenylene ether and observed in the range of from 230 to 270° C.

BEST MODE FOR CARRYING OUT THE INVENTION

Hereinbelow, the present invention will be described in more detail with reference to the following Examples and Comparative Examples, which should not be construed as limiting the scope of the present invention.

In the Examples and Comparative Examples, the measurements and evaluations were conducted by the following methods.

(1) Isolation and purification of the polyphenylene ether in the polyphenylene ether resin composition:

About 10 g of the polyphenylene ether resin composition is introduced into 150 ml of chloroform. The resultant mixture is subjected to centrifugal separation to separate the mixture into a supernatant and solids. The solids are discarded, and the supernatant is recovered. To the recovered supernatant is added a large amount of methanol to precipitate a polymer component dissolved in the supernatant. The precipitated polymer component is recovered by filtration, followed by multiple washings with methanol, thereby obtaining wet solids. The obtained wet solids are dried in a vacuum drier (manufactured and sold by Ishii Shouten, Co., Ltd., Japan) having a temperature of 110° C. for 5 hours. The resultant dried solids are introduced into about 100 ml of methylene chloride. The resultant mixture is allowed to stand still at −5° C. for 24 hours to form a precipitate therein. The precipitate is recovered as a filtration residue by filtration. The filtration residue is washed with methylene chloride cooled to a temperature of from 0 to 5° C., as swiftly as possible, wherein the amount of the methylene chloride is three times the weight of the filtration residue. The resultant filtration residue is dried in the above-mentioned vacuum drier having a temperature of 110° C. for 5 hours, thereby obtaining a purified polyphenylene ether.

(2) Proton nuclear magnetic resonance spectroscopy ($^1$H-NMR) of the polyphenylene ether in the polyphenylene ether resin composition:

A purified polyphenylene ether is obtained from the polyphenylene ether resin composition by the above-mentioned method. 50 mg of the purified polyphenylene ether is dissolved in 0.8 ml of deuterated chloroform to obtain a solution. The thus obtained solution is analyzed by $^1$H-NMR using a proton nuclear magnetic resonance spectroscopy apparatus (trade name: GSX-400; manufactured and sold by JEOL Ltd., Japan), wherein tetramethylsilane is used as a reference for chemical shift (0 ppm).

(3) Ultraviolet-visible spectroscopy of the polyphenylene ether in the polyphenylene ether resin composition:

A purified polyphenylene ether is obtained from the polyphenylene ether resin composition by the above-mentioned method. The purified polyphenylene ether is dissolved in chloroform to obtain a 0.05 g/ml solution of a polyphenylene ether in chloroform. The thus obtained solution is analyzed by ultraviolet-visible spectroscopy using an ultraviolet-visible spectroscopy apparatus (trade name: U-3210; manufactured and sold by Hitachi Ltd., Japan), wherein a cell having an optical path of 1 cm is used. By the ultraviolet-visible spectroscopy, the absorbance of the solution at a wave length of 480 nm is measured.

(4) Weight average molecular weight and number average molecular weight of the polyphenylene ether in the polyphenylene ether resin composition:

A purified polyphenylene ether is obtained from the polyphenylene ether resin composition by the above-mentioned method. The purified polyphenylene ether is dissolved in chloroform to obtain a solution. The thus obtained solution is subjected to gel permeation chromatography (GPC) to thereby measure the weight average molecular weight and number average molecular weight of the polyphenylene ether. In the GPC, a calibration curve obtained with respect to standard monodisperse polystyrene samples is used, wherein the molecular weights of the standard monodisperse polystyrene samples are 550, 1,300, 2,960, 9,680, 28,600, 65,900, 172,000, 629,000, 996,000, 1,560,000 and 3,900,000. The conditions for the GPC are as follows:

GPC apparatus: gel permeation chromatography SHODEX·GPC system 21 (trade name; manufactured and sold by Showa Denko K. K., Japan).

Column: SHODEX K-800D, SHODEX K-805L and SHODEX K-805L (trade names; each of which is manufactured and sold by Showa Denko K.K., Japan), connected in series.

Column temperature: 40° C.

Carrier: chloroform (flow rate: 1.0 ml/min)

Detector: UV absorption detector, which is attached to the GPC apparatus. In the preparation of the calibration curve, a light having a wave length of 254 nm is used as a monitoring light. On the other hand, when the polyphenylene ether is subjected to GPC, a light having a wave length of 283 nm is used as a monitoring light.

(5) Differential Scanning Calorimetry (DSC):

There is provided a pellet of a polyphenylene ether resin composition which has not experienced heat treatment at 180° C. or more. The pellet is cut by means of a microtome to thereby obtain several films each having a thickness of about 20 μm, a width of about 2 mm and a length of about 2 mm, wherein the total weight of the films is in the range of from 4 to 6 mg. The obtained films are put one upon another, followed by press-bonding, thereby obtaining a sample for DSC.

The sample is enclosed in an aluminum pan designed for DSC. The aluminum pan containing the sample is subjected to DSC using DSC-7 (trade name; manufactured and sold by Perkin Elmer Cetus Co., Ltd., U.S.A.) under conditions wherein the temperature of the sample is elevated at a rate of 20° C./min from 50° C. to 300° C. in an atmosphere of nitrogen gas, thereby measuring the amount of heat absorbed by the polyphenylene ether, wherein the amount of heat absorbed by the polyphenylene ether is defined by the area of an endothermic peak ascribed to the polyphenylene ether and observed in the range of from 230 to 270° C.

When an endothermic peak ascribed to a component other than the polyphenylene ether is observed in the range of from 230 to 270° C., a second DSC is conducted and, based on the results of the second DSC and the above-mentioned DSC (first DSC), the amount of heat absorbed by the polyphenylene ether is obtained. Specifically, the second DSC is conducted as follows.

The sample taken immediately after the first DSC, which has a temperature of 300° C., is maintained at 300° C. for 5 minutes. Then, the temperature of the sample is lowered at a rate of 20° C./min from 300° C. to 50° C. Then, the sample is subjected to the second DSC under conditions wherein the temperature of the sample is elevated at a rate of 20° C./min from 50° C. to 300° C., thereby determining an endothermic peak in the range of from 230 to 270° C. Since the endothermic peak ascribed to the polyphenylene ether completely disappears as a result of the above-mentioned maintenance of the temperature of the sample at 300° C. for 5 minutes, an endothermic peak observed in the second DSC is ascribed to a component other than the polyphenylene ether. Based on the results of the first DSC and second DSC, the amount of heat absorbed by the polyphenylene ether is obtained by calculation.

The calibrations of the temperature for the DSC and the amount of heat absorbed by the polyphenylene ether or the like are conducted using indium.

(6) Volatile Component Content of the Polyphenylene Ether Resin Composition:

A pellet of the polyphenylene ether resin composition is dried in a vacuum drier (manufactured and sold by Ishii Shouten, Co., Ltd., Japan) having a temperature of 150° C. for 2 days. The weights of the resin composition before and after the drying are measured. The volatile component content of the resin composition is calculated by the following formula:

Volatile component content of the resin composition (% by weight)=[{(weight of the resin composition before drying)−(weight of the resin composition after drying)}/(weight of the resin composition before drying)]×100.

(7) Melt Flow Index (MFR) of the Polyphenylene Ether Resin Composition:

With respect to a pellet of the polyphenylene ether resin composition, the MFR thereof (unit: g/10 min) is measured using a melt indexer (trade name: P-111; manufactured and sold by Toyo Seiki Co., Ltd., Japan) at 250° C. under a load of 10 kg in accordance with ASTM D1238-95.

The larger the MFR, the better the fluidity of the resin composition.

(8) Short Shot Pressure (SSP):

The lowest injection pressure (unit: MPa) that is needed for producing, by injection molding, a dumbbell specimen (according to ASTM D638-95) from the polyphenylene ether resin composition in the form of pellets is measured, wherein the pressure is indicated in terms of the gauge pressure. The measurement is conducted using an injection molding machine (IS-80C: trade name; manufactured and sold by Toshiba Machine Co., Ltd., Japan) under conditions wherein the molding temperature is 290° C. and the mold temperature is 80° C. The SSP means the above-mentioned lowest injection pressure.

The smaller the SSP, the better the fluidity of the resin composition.

(9) Tensile Strength Retention of the Polyphenylene Ether Resin Composition:

Using an injection molding machine (trade name: IS-80C; manufactured and sold by Toshiba Machine Co., Ltd., Japan), a dumbbell specimen (according to ASTM D638-95) is produced from pellets of the polyphenylene ether resin composition. The tensile strength of the dumbbell specimen is measured in accordance with ASTM D638-95. The dumbbell specimen is stressed so as to be curved with its outer side length elongated by 1% as strain, and the curved dumbbell specimen is immersed in a mixture of isopropanol with n-hexane (wherein the isopropanol/n-hexane weight ratio is 70/30) at 23° C. for 30 minutes. The tensile strength of the dumbbell specimen after the immersion is measured in accordance with ASTM D638-95. The tensile strength retention (%) is defined by the following formula:

Tensile strength retention (%)={(tensile strength of the dumbbell specimen after immersion)/(tensile strength of the dumbbell specimen before immersion)}×100.

The larger the tensile strength retention, the better the chemicals resistance of the resin composition.

(10) Evaluation of the Appearance of a Molded Article:

Using an injection molding machine (trade name: IS-80C; manufactured and sold by Toshiba Machine Co., Ltd., Japan), the polyphenylene ether resin composition in the form of pellets is subjected to an injection molding under conditions wherein the molding temperature is 290° C. and the mold temperature is 80° C., thereby producing a tabular test specimen having a length of 90 mm, a width of 50 mm and a thickness of 2 mm. The occurrence of silver streaks on the surface of the test specimen is visually observed and evaluated by the following criteria:

1: Silver streaks are observed on the whole surface of the test specimen.

2: Silver streaks are observed on an area which covers about a half of the area of the surface of the test specimen.

3: Silver streaks are observed on an area which covers about one-tenth of the area of the surface of the test specimen.

4: Silver streaks are observed only on the portion (of the test specimen) nearest the gate portion.

5: No silver streak is observed on the surface of the test specimen.

EXAMPLE 1

Production of a Raw Material Polyphenylene Ether

There was provided a reactor having a capacity of 50 liters, which was equipped with a sparger for the introduction of oxygen gas, a turbine blade for stirring, a baffle, a jacket and a pipe (for gas vent) having a reflux condenser, wherein the pipe was provided at the upper portion of the reactor. Into the reactor were charged 3.3497 g of cuprous oxide, 20.1484 g of a 47% aqueous solution of hydrogen bromide, 39.0655 g of di-n-butylamine, 86.08 g of dimethyl-n-butylamine, 8.0692 g of N,N'-di-t-butylethylenediamine, 2.000 g of trioctylmethylammonium chloride and 14730.3 g of toluene, thereby obtaining a liquid mixture. Oxygen-gas (temperature: 40° C.; pressure: atmospheric pressure) was introduced into the reactor through the sparger at a rate of 3.9 liter/min while vigorously stirring the liquid mixture. At the same time, a solution obtained by dissolving 2,600 g of 2,6-dimethylphenol in a mixture of 2498.0 g of toluene and 13 g of dimethyl-n-butylamine was fed to the reactor by using a plunger pump at a rate wherein it took 35 minutes to complete the feeding of the whole amount of the solution to the reactor. By conducting the above-mentioned operation (i.e., introduction of oxygen gas and feeding of the solution), an oxidative polymerization reaction was effected. After 100 minutes from the start of the polymerization reaction, the introduction of oxygen gas into the reactor was stopped (that is, the oxidative polymerization reaction was performed for 100 minutes). During the polymerization reaction, the reaction temperature was maintained at 40° C. by introducing a heating medium into the jacket. The polymerization reaction was performed under atmospheric pressure.

To the resultant polymerization reaction mixture was added an aqueous solution of trisodium ethylenediaminetetraacetate, wherein the amount of the aqueous solution was one-tenth the weight of the polymerization reaction mixture (i.e., the molar ratio of the trisodium ethylenediaminetetraacetate contained in the aqueous solution to the copper contained in the above-mentioned cuprous oxide was 2). The temperature of the resultant mixture was maintained at 70° C. Thereafter, the mixture was subjected to a centrifugal separation using a Sharpless centrifugal separator (trade name: T-1P; manufactured and sold by TOMOE Engineering Co., Ltd., Japan) to thereby separate the mixture into a polymer solution phase and an aqueous phase. The polymer solution phase was recovered. To the recovered polymer solution phase was added methanol having a temperature of about 50° C. to form a precipitate. The formed precipitate was recovered by filtration. The recovered precipitate was washed with methanol having a temperature of about 50° C. (wherein the amount of the methanol was from 4 to 5 times the weight of the precipitate), followed by drying in a vacuum drier (trade name: VOS-601 SD; manufactured and sold by Tokyo Rikakikai Co., Ltd., Japan) having a temperature of 140° C. for 8 hours, thereby obtaining 2.4 kg of a raw material polyphenylene ether in the form of a dried powder. (Production of a polyphenylene ether resin composition)

The following components (1) to (4) were charged into a Henschel mixer (trade name: FM-3; manufactured and sold by Mitsui Mining Co., Ltd., Japan) and mixed at room temperature for 5 minutes:

(1) 78 parts by weight of the above-obtained raw material polyphenylene ether in the form of a dried powder, (2) 11 parts by weight of a styrene homopolymer resin (trade name: GPPS685; manufactured and sold by A&M Styrene Co., Ltd., Japan), (3) 11 parts by weight of an impact resistant styrene polymer resin (trade name: high impact polystyrene H9405; manufactured and sold by A&M Styrene Co., Ltd., Japan), and (4) 9 parts by weight of a phosphorus-containing flame retardant (trade name: CR-741; manufactured and sold by Daihachi Chemical Industry Co., Ltd., Japan).

The resultant mixture containing the above-mentioned components (1) to (4) was melt-kneaded using a twin-screw extruder (trade name: ZSK-25; manufactured and sold by WERNER & PFLEIDER GmbH) (which has a screw having a diameter of 25 mm as shown in Example 1 of Unexamined Japanese Patent Application Laid-open Specification No. 2001-47496) under conditions wherein the residence time was 59 seconds (which meant that the extrusion rate was 200 g/min), thereby extruding a strand of a polyphenylene ether resin composition. The temperature of the resin composition at the outlet of the extruder was maintained in the range of from 320 to 330° C. The extruded strand was placed in a strand bath in which the temperature of the water was maintained at 60° C. The resultant strand was cut into pieces using a pelletizer (trade name: SCF-100; manufactured and sold by Isuzu Kakouki Co., Ltd., Japan) to thereby obtain a polyphenylene ether resin composition in the form of pellets.

(Measurements and Evaluations)

With respect to the obtained pellets, the differential scanning calorimetry (DSC), the measurement of the volatile component content, the measurement of the MFR, the measurement of the SSP, the measurement of the tensile strength retention and the evaluation of the appearance were conducted by the above-mentioned methods. Further, a purified polyphenylene ether was obtained from the above-mentioned polyphenylene ether resin composition pellets by the above-mentioned method. With respect to the purified polyphenylene ether, the proton nuclear magnetic resonance spectroscopy ($^1$H-NMR), the ultraviolet-visible spectroscopy and the measurement of the weight average molecular weight and number average molecular weight were conducted by the above-mentioned methods. The results are shown in Table 1.

Also, a chart showing the $^1$H-NMR spectrum of the purified polyphenylene ether is shown in FIG. 1. In this chart, only signals which are characteristic of the present invention are shown.

EXAMPLE 2

A polyphenylene ether resin composition in the form of pellets was produced in substantially the same manner as in Example 1, except that the temperature of the resin composition at the outlet of the extruder was maintained in the range of from 335 to 345° C.

With respect to the produced pellets, the DSC, the measurement of the volatile component content, the measurement of the MFR, the measurement of the SSP, the measurement of the tensile strength retention and the evaluation of the appearance were conducted by the above-mentioned methods. Further, a purified polyphenylene ether was obtained from the above-mentioned polyphenylene ether resin composition pellets by the above-mentioned method. With respect to the purified polyphenylene ether, the proton nuclear magnetic resonance spectroscopy, the ultraviolet-visible spectroscopy and the measurement of the weight average molecular weight and number average molecular weight were conducted by the above-mentioned methods. The results are shown in Table 1.

EXAMPLE 3

A polyphenylene ether resin composition in the form of pellets was produced in substantially the same manner as in Example 1, except that the temperature of the resin composition at the outlet of the extruder was maintained in the range of from 290 to 300° C.

With respect to the produced pellets, the DSC, the measurement of the volatile component content, the measurement of the MFR, the measurement of the SSP, the measurement of the tensile strength retention and the evaluation of the appearance were conducted by the above-mentioned methods. Further, a purified polyphenylene ether was obtained from the above-mentioned polyphenylene ether resin composition pellets by the above-mentioned method. With respect to the purified polyphenylene ether, the proton nuclear magnetic resonance spectroscopy, the ultraviolet-visible spectroscopy and the measurement of the weight average molecular weight and number average molecular weight were conducted by the above-mentioned methods. The results are shown in Table 1.

COMPARATIVE EXAMPLE 1

A polyphenylene ether resin composition in the form of pellets was produced in substantially the same manner as in Example 3, except that the residence time was 20 seconds (which meant that the extrusion rate was 600 g/min).

With respect to the produced pellets, the DSC, the measurement of the volatile component content, the measurement of the MFR, the measurement of the SSP, the measurement of the tensile strength retention and the evaluation of the appearance were conducted by the above-mentioned methods. Further, a purified polyphenylene ether was obtained from the above-mentioned polyphenylene ether resin composition pellets by the above-mentioned method. With respect to the purified polyphenylene ether, the proton nuclear magnetic resonance spectroscopy, the ultraviolet-visible spectroscopy and the measurement of the weight average molecular weight and number average molecular weight were conducted by the above-mentioned methods. The results are shown in Table 1.

COMPARATIVE EXAMPLE 2

A polyphenylene ether resin composition in the form of pellets was produced in substantially the same manner as in Example 1, except that the residence time was 20 seconds (which meant that the extrusion rate was 600 g/min).

With respect to the produced pellets, the DSC, the measurement of the volatile component content, the measurement of the MFR, the measurement of the SSP, the measurement of the tensile strength retention and the evaluation of the appearance were conducted by the above-mentioned methods. Further, a purified polyphenylene ether was obtained from the above-mentioned polyphenylene ether resin composition pellets by the above-mentioned method. With respect to the purified polyphenylene ether, the proton nuclear magnetic resonance spectroscopy, the ultraviolet-visible spectroscopy and the measurement of the weight average molecular weight and number average molecular weight were conducted by the above-mentioned methods. The results are shown in Table 1.

TABLE 1

| | Analysis of the polyphenylene ether purified from the resin composition | | | | Analysis of the resin composition | | | | | |
|---|---|---|---|---|---|---|---|---|---|---|
| | Proton nuclear magnetic resonance spectroscopy *1) | Ultra violet-visible spectroscopy *2) | Mw *3) | Mn *4) | DSC (J/g) | Volatile component content (% by weight) | MFR (g/10 min) *5) | SSP (MPa) *6) | Tensile strength retention (%) *7) | Appearance *8) |
| Ex. 1 | 0.138 | 0.29 | 72700 | 25200 | 0.02 | 0.26 | 8.5 | 7.16 | 64 | 5 |
| Ex. 2 | 0.110 | 0.34 | 72100 | 25100 | 0.01 | 0.1 | 7.9 | 7.65 | 65 | 5 |
| Ex. 3 | 0.085 | 0.25 | 72800 | 25100 | 0.05 | 0.98 | 7.5 | 7.88 | 70 | 4 |
| Compara. Ex. 1 | 0.022 | 0.29 | 73000 | 31800 | 0.98 | 2.1 | 4.7 | 9.03 | 88 | 1 |
| Compara. Ex. 2 | 0.046 | 0.35 | 72600 | 25200 | 0.06 | 1.5 | 4.9 | 9.10 | 72 | 2 |
| Compara. Ex. 3 | No peak was observed at 3.55 ppm | 0.68 | 74800 | 31200 | 0.04 | 0.56 | 4.3 | 10.0 | 90 | 3 |

Notes:
*1) relative intensity of a triplet signal (S1) observed at 3.55 ppm in terms of the percentage of the integrated intensity of the triplet signal (S1), based on the integrated intensity of a signal (S2) observed at 6.47 ppm
*2) absorbance at 480 nm as measured with respect to a 0.05 g/ml chloroform solution of a polyphenylene ether using a cell having an optical path of 1 cm
*3) weight average molecular weight as measured by GPC using a calibration curve obtained with respect to standard monodisperse polystyrene samples
*4) number average molecular weight as measured by GPC using a calibration curve obtained with respect to standard monodisperse polystyrene samples
*5) the larger the value, the better the fluidity of the resin composition
*6) the smaller the value, the better the fluidity of the resin composition
*7) the larger the value, the better the chemicals resistance of the resin composition
*8) the larger the value, the better the appearance of a molded article obtained from the resin composition

COMPARATIVE EXAMPLE 3

A polyphenylene ether resin composition in the form of pellets was produced in substantially the same manner as in Example 1, except that di-n-butylamine was not used in the oxidative polymerization reaction for producing the raw material polyphenylene ether and that the polymerization reaction time was 130 minutes.

With respect to the produced pellets, the DSC, the measurement of the volatile component content, the measurement of the MFR, the measurement of the SSP, the measurement of the tensile strength retention and the evaluation of the appearance were conducted by the above-mentioned methods. Further, a purified polyphenylene ether was obtained from the above-mentioned polyphenylene ether resin composition pellets by the above-mentioned method. With respect to the purified polyphenylene ether, the proton nuclear magnetic resonance spectroscopy, the ultraviolet-visible spectroscopy and the measurement of the weight average molecular weight and number average molecular weight were conducted by the above-mentioned methods. The results are shown in Table 1.

INDUSTRIAL APPLICABILITY

The polyphenylene ether resin composition of the present invention not only has excellent properties comparable to those of conventional polyphenylene ether resin compositions, especially with respect to heat resistance, electrical characteristics, acid resistance, alkali resistance, dimensional stability, low specific gravity and low water absorption, but also exhibits an excellent balance of fluidity, chemicals resistance (i.e., resistance to organic solvents and oils) and molded article appearance as well as excellent color of a molded article obtained therefrom. Therefore, the polyphenylene ether resin composition of the present invention can be advantageously used in various application fields, such as thin-walled parts and oil-resistant parts (e.g., electric and electronic parts and automobile parts) which stay intact even when oils adhere thereto.

The invention claimed is:

1. A polyphenylene ether resin composition comprising a polyphenylene ether and a styrene polymer resin, the content of said polyphenylene ether in said composition being from 10 to 90% by weight, said polyphenylene ether having a polymer chain comprising recurring units each represented by the following formula (1):

(1)

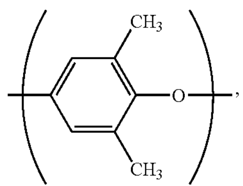

said composition being characterized in that the polyphenylene ether, when isolated from the composition and purified, has the following characteristics (a), (b) and (c):

(a) when dissolved in deuterated chloroform and analyzed by proton nuclear magnetic resonance spectroscopy ($^{1}$H-NMR) using tetramethylsilane as a reference for chemical shift, said isolated and purified polyphenylene ether exhibits a triplet signal (S1) at 3.55 ppm, said triplet signal (S1) having a relative intensity of 0.05 to 0.25 in terms of the percentage of the integrated intensity of said triplet signal (S1), based on the integrated intensity of a signal (S2) observed at 6.47 ppm;

(b) when a 0.05 g/ml solution of said isolated and purified polyphenylene ether in chloroform is analyzed by ultraviolet-visible spectroscopy using a cell having an optical path of 1 cm, said polyphenylene ether exhibits an absorbance of from 0.01 to 0.40 at a wavelength of 480 nm; and (c) said isolated and purified polyphenylene ether has a weight average molecular weight of from 30,000 to 100,000 as measured by gel permeation chromatography using a calibration curve obtained with respect to standard monodisperse polystyrene samples.

2. The polyphenylene ether resin composition according to claim 1, wherein, in the curve obtained by subjecting said composition to differential scanning calorimetry, the amount of heat absorbed by said polyphenylene ether is not more than 0.1 J/g, as defined by the area of an endothermic peak ascribed to said polyphenylene ether, said endothermic peak being observed in the range of from 230 to 270° C.

3. The polyphenylene ether resin composition according to claim 1, which has a volatile component content of 2% by weight or less.

4. The polyphenylene ether resin composition according to claim 1, wherein said relative intensity of said triplet signal (S1) in the $^{1}$H-NMR is from 0.05 to 0.15, and said absorbance in the ultraviolet-visible spectroscopy is from 0.01 to 0.30.

5. The polyphenylene ether resin composition according to claim 1, which is produced by melt-kneading a mixture comprising a raw material polyphenylene ether and a styrene polymer resin at a temperature of from 240 to 390° C. for a residence time of from 25 to 300 sec, said raw material polyphenylene ether being produced by feeding a solution of 2,6-dimethylphenol to a reactor having been charged with a liquid mixture, while introducing an oxygen-containing gas to said reactor, thereby performing oxidative polymerization of 2,6-dimethylphenol, wherein said solution of 2,6-dimethylphenol fed to said reactor is obtained by dissolving 2,6-dimethylphenol in a mixture of toluene and dimethyl-n-butylamine, wherein said liquid mixture charged to said reactor contains toluene and a polymerization catalyst which contains cuprous oxide, an aqueous solution of hydrogen bromide, di-n-butylamine, dimethyl-n-butylamine, N,N'-di-t-butylethylenediamine and trioctylmethylammonium chloride, wherein the amount of 2,6-dimethylphenol fed to said reactor is 13% by weight, based on the total weight of said solution fed to said reactor and said liquid mixture charged to said reactor.

* * * * *